US012196453B2

(12) United States Patent
Weller

(10) Patent No.: US 12,196,453 B2
(45) Date of Patent: Jan. 14, 2025

(54) METHODS TO DETECT LOW HOT WATER RESERVE CONDITION

(71) Applicant: GreenWave Energy, LLC, Apollo Beach, FL (US)

(72) Inventor: George Heber Weller, Apollo Beach, FL (US)

(73) Assignee: GreenWave Energy, LLC, Apollo Beach, FL (US)

( * ) Notice: Subject to any disclaimer, the term of this patent is extended or adjusted under 35 U.S.C. 154(b) by 1096 days.

(21) Appl. No.: 17/098,413

(22) Filed: Nov. 15, 2020

(65) Prior Publication Data

US 2021/0333015 A1 Oct. 28, 2021

Related U.S. Application Data

(60) Provisional application No. 62/973,059, filed on Sep. 16, 2019.

(51) Int. Cl.
*F24H 15/168* (2022.01)
*F24H 9/20* (2022.01)
*F24H 15/174* (2022.01)
*F24H 15/20* (2022.01)
*F24H 15/225* (2022.01)
(Continued)

(52) U.S. Cl.
CPC ......... *F24H 15/168* (2022.01); *F24H 9/2021* (2013.01); *F24H 15/20* (2022.01); *F24H 15/225* (2022.01); *F24H 15/37* (2022.01); *F24H 15/407* (2022.01); *F24H 15/486* (2022.01); *G05D 23/1923* (2013.01); *H05B 1/0283* (2013.01); *F24H 15/174* (2022.01); *F24H 15/414* (2022.01); *Y04S 20/222* (2013.01)

(58) Field of Classification Search
CPC ...... F24H 15/168; F24H 15/407; F24H 15/37; F24H 15/486
USPC .......................................... 392/340
See application file for complete search history.

(56) References Cited

U.S. PATENT DOCUMENTS 8,768,526 B2 * 7/2014 Harbin, III ............ F24H 1/0018
219/486
9,151,516 B2    10/2015 Buescher et al.
(Continued)

FOREIGN PATENT DOCUMENTS

WO    WO 2020/047652    3/2020

*Primary Examiner* — Steven W Crabb
*Assistant Examiner* — Thomas J Ward
(74) *Attorney, Agent, or Firm* — Stankek Lemon Crouse & Meeks PA

(57) ABSTRACT

A method of operating a water heater in a load shed mode can include detecting that an upper water heater thermostat control module in a water heater is calling for heat to be provided via an upper heating element of the water heater while the water heater is in a load shed mode of operation wherein a first leg of power to the water heater is decoupled from an input to the upper water heater thermostat control module and responsive to the upper water heater thermostat control module calling for heat, transmitting a signal to end the load shed mode of operation at the water heater so that the first leg of power to the water heater is coupled to the input of the upper water heater thermostat control module so that the upper heating element of the water heater is enabled to heat water responsive to the upper water heater thermostat control module calling for heat.

18 Claims, 10 Drawing Sheets

(51) Int. Cl.

| | |
|---|---|
| *F24H 15/37* | (2022.01) |
| *F24H 15/407* | (2022.01) |
| *F24H 15/414* | (2022.01) |
| *F24H 15/486* | (2022.01) |
| *G05D 23/19* | (2006.01) |
| *H05B 1/02* | (2006.01) |

(56) References Cited

U.S. PATENT DOCUMENTS

| | | |
|---|---|---|
| 9,152,160 B2 | 10/2015 | Harbin, III et al. |
| 10,443,894 B2 | 10/2019 | Branecky et al. |
| 2014/0037275 A1* | 2/2014 | Flohr .................. H02J 3/14 |
| | | 392/464 |
| 2018/0080684 A1 | 3/2018 | Lesage |
| 2019/0086121 A1 | 3/2019 | Branecky et al. |
| 2019/0293303 A1 | 9/2019 | Zhang |

* cited by examiner

METHODS TO DETECT LOW HOT WATER RESERVE CONDITION

CROSS-REFERENCE TO RELATED APPLICATIONS

This application claims priority to U.S. Provisional Patent Application No. 62/973,059, filed Sep. 16, 2019, in the U.S.P.T.O., the entire disclosure of which is incorporated herein by reference.

FIELD

The invention relates to the field of electrical systems in general, and more particularly, to power systems management.

BACKGROUND

Electric water heaters represent a large electric load that can be used at times that may be difficult to predict. It is known for electric utilities to install load control devices on residential electric water heaters to interrupt the electric power to those water heaters during peak load times (which is sometimes referred to as a "load shed"). In most cases, there may be an adequate quantity of hot water in the tank and available to meet the customer's needs even when the water heater is prevented from running during load shed. Not all customers, however, may have enough hot water for the duration of a load shed event if the load shed occurs during a period when the customer has a particular demand. Moreover, it may be difficult for the electric utility to know if a particular customer is at risk of exhausting their hot water reserve. This lack of capability may cause the electric utility to terminate the entire load control event when only a small percentage of customers are at risk of depleting their hot water reserve.

Several techniques have been used to detect a low hot water reserve condition including installing temperature probes/sensors and/or water flow detectors on the electric water heater. These probes/sensors are often installed under the insulation on the outside of the tank or inside the tank for direct temperature measurements. After the monitoring probes/sensors have been attached to the water heater, however, they are then connected to a load control device by, for example, running a pair of wires from the probe/sensor back to the load control device. The number of different model water heaters, however, may each require different installation techniques. Moreover, such modifications may void the water heater's UL listing and/or manufacturer's warranty.

Another problem faced by electrical utilities is the peak demand for electricity during certain time periods, such as during extremely hot or cold weather. Traditionally, electrical service providers can meet this peak demand by purchasing expensive electricity from the power grid or, in extreme cases reduce service to entire neighborhoods or sectors of a grid, thereby totally eliminating or coarsely reducing the load.

Another approach may be to reduce peak demand by eliminating or reducing the demand from some electrical appliances, such as heating units, air conditioners, and/or water heaters, while leaving other devices, such as lights and small appliances, operating normally. Some Electric utilities offer programs where water heaters and air conditioners may be shutoff during peak periods. Such an approach, however, can be an inconvenience to some customers, especially if the offered financial incentives are small. Another approach is real-time pricing for industrial customers, where a financial penalty/reward system is offered to customers who can shift load to times where the electrical service provider can more easily meet the demand.

If these types of approaches are not effective, the electrical service provider may need to add additional power generation capacity by building new power plants even though the peak demand for power may exceed current capacity by only a small margin.

SUMMARY

Embodiments according to the present invention can provide methods and circuits configured to detect low hot water reserve condition and related articles of manufacture. Pursuant to these embodiments, a method of operating a water heater in a load shed mode can include detecting that an upper water heater thermostat control module in a water heater is calling for heat to be provided via an upper heating element of the water heater while the water heater is in a load shed mode of operation wherein a first leg of power to the water heater is decoupled from an input to the upper water heater thermostat control module and responsive to the upper water heater thermostat control module calling for heat, transmitting a signal to end the load shed mode of operation at the water heater so that the first leg of power to the water heater is coupled to the input of the upper water heater thermostat control module so that the upper heating element of the water heater is enabled to heat water responsive to the upper water heater thermostat control module calling for heat.

In some embodiments according to the invention, a circuit configured to operate a water heater in a load shed mode of operation can be provided by a voltage signal level detection circuit including a first input, a second input, and an output, the first input configured to couple to an input terminal of a load shed relay (LSR) circuit located in-series with a first one of a pair of ac voltage conductors configured to provide power to the water heater, the second input configured to couple to input of an upper water heater thermostat control module coupled to the output terminal of the load shed relay circuit. The voltage signal level detection circuit is configured to detect a discontinuity in a voltage signal measured across the first and second inputs indicating a break-before-make state of the upper water heater thermostat control module.

In some embodiments according to the invention, a method of operating a water heater in a load shed mode can include decoupling at least one power conductor of a pair of conductors from an input terminal of an upper water heater thermostat control module, coupled to an upper heating element of a water heater, responsive to a load shed mode being activated monitoring, using a voltage signal level detection circuit, a voltage signal measured across the input of a load shed relay and an output of the load shed relay coupled to an input of the upper water heater thermostat control module while the load shed mode is active to provide a monitored line voltage.

DETAILED DESCRIPTION OF EMBODIMENTS ACCORDING TO THE INVENTION

Figure 1:
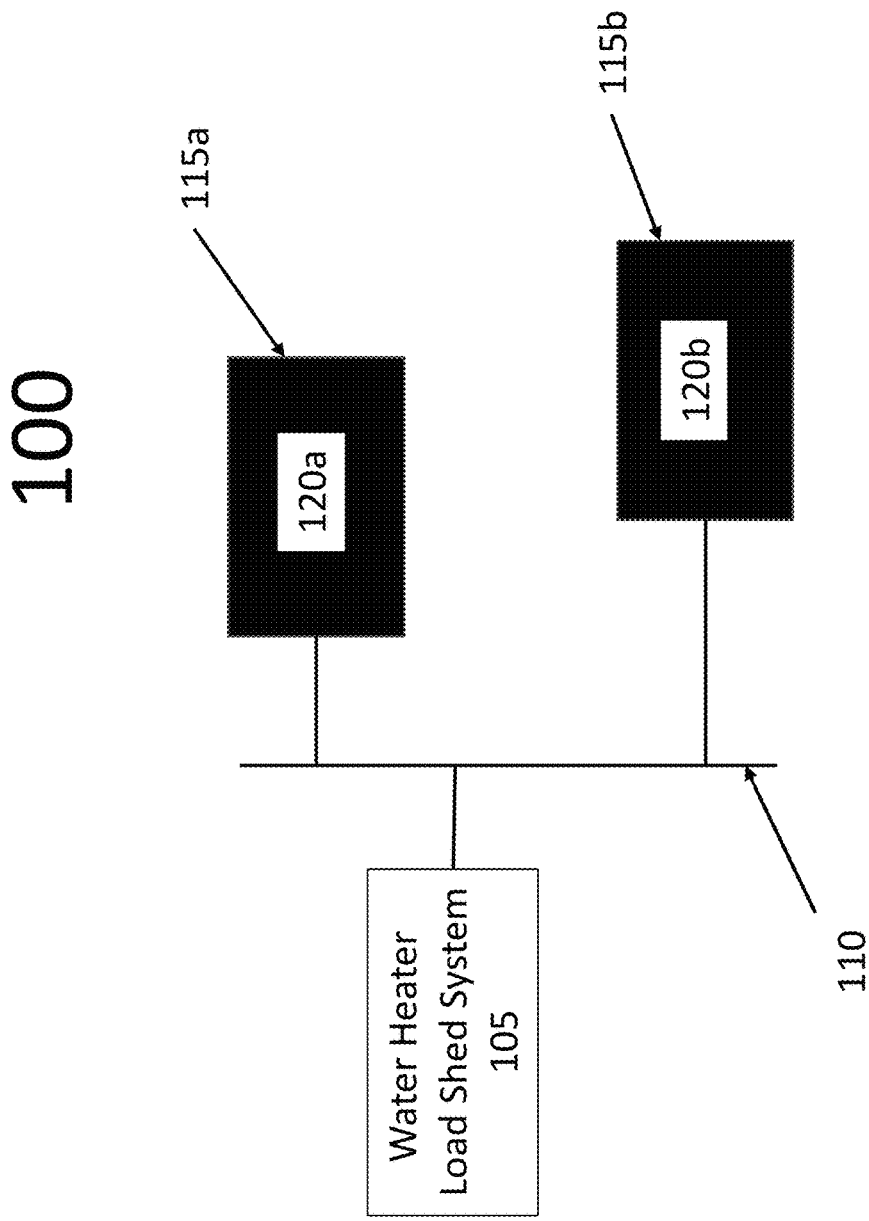
FIG. 1 is a block diagram that illustrates a power distribution network coupling a load shed system administered by an electrical utility to a plurality of locations each including water heating units that operate in a load shed mode to couple/decouple a leg of power to/from the respective water heating unit responsive to detecting an indication of a low hot water reserve condition in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As appreciated by the present inventors, embodiments according to the present invention can provide a non-invasive approach to detect the operational characteristics of conventional resistance electric water heating units (sometime referred to as water heating units). For example, some conventional storage water heaters are constructed as an insulated vertical pressure water tank. Inside the tank, there can be at least two heating elements where a first heating element can be located in an upper portion of the tank (for example, about a foot below the top of the tank) and a second heating element proximate to the bottom of the tank. Each of these heating elements can operate responsive to a respective water heater thermostat control module.

To limit the amount of electric current needed to run, the water heater is configured to allow only one heating element to run at a time (i.e., the water heater is configured to prevent both heating elements from heating water simultaneously). Further, the water heater is configured so that the upper heating element has priority over the lower heating element. This operation is provided such that when both water heater thermostat control modules sense that the water temperature in the respective portion of the tank are below the respective set-point, the upper element is allowed to heat water whereas the lower element is prevented from heating water. This is done so that when the tank is cold, the upper heating element can more quickly provide hot water as the upper heating element only has to heat the water at the upper portion of the tank. In contrast, the lower element is used to heat the water in the remaining portion of the tank once the upper water heater thermostat control module indicates that the water in the upper portion of the tank has been heated to the respective temperature set-point for the upper portion of the tank (sometimes referred to herein as being "satisfied.")

The upper water heater thermostat control module as a single pole double throw relay. When the temperature setting (set-point) of the upper water heater thermostat control module is reached, the single pole double throw relay switches power away from the upper element to an input of the lower water heater thermostat control module, which also disables heating by the upper heating element.

The lower water heater thermostat control module operates as a single pole single throw relay, which either switches power from the input to the lower heating element (when heating of the lower portion is called for as indicated by the temperature set-point of the lower water heater thermostat control module) or decouples the power at the input from the lower heating element until such time that the lower water heater thermostat control module temperature set-point is reached (i.e., satisfied). When each of the water heater thermostat control modules detect that the respective temperature set-points has been achieved, the tank is at full hot water capacity and no more electricity may be used to heat water. In other words, once the tank is at full hot water capacity the upper water heater thermostat control module has switched power to the lower water heater thermostat control module, which does not provide power to the lower heating element.

When hot water is drawn from the tank, cold water flows into the bottom of the tank. This keeps the replacement cold water from mixing with the remaining hot water making it possible to use the entire tank of hot water. When the replacement cold water is sensed by the lower water heater thermostat control module, power is coupled to the lower heating element to heat the cold replacement water and thereby replace the hot water used.

During a load shedding event, a load control device can decouple electricity from the water heater. When the water heater is in a load shedding event (sometimes referred to herein as "load shed mode of operation"), any hot water drawn from the water heater is replaced with cold water flowing into the bottom of the tank which is not heated due to the power being blocked by the load shedding event. As more water is drawn by the user, the amount of cold water in the tank increases, filling from the bottom of the tank, while the volume of hot water decreases.

As appreciated by the present inventors, if enough hot water is drawn, eventually the water temperature sensed by the upper water heater thermostat control module drops below the respective temperature set-point. In response, the upper water heater thermostat control module calls for heat so that the relay disconnects the lower water heater thermostat control module from the electric circuit and connects the electric circuit to the upper heating element. At this point the amount of reserve hot water has dropped to a point that indicates detection of a low hot water reserve condition. In response, control over the water heating unit may be terminated or paused from the load-shedding event so that the water heating unit can replenish the hot water reserve, which may avoid a situation where the customer runs out of hot water.

As appreciated by the present inventors, the low hot water reserve condition can be detected by monitoring the switching of the upper water heater thermostat control module when in load shed mode. In particular, in some embodiments, a voltage signal level detection circuit can detect when the upper water heater thermostat control module switches away from the lower water heater thermostat control module back to the upper heating element. For example, in some embodiments, the voltage signal across the load control device (such as a load shed relay) can be monitored to detect when the upper water heater thermostat control module switches away from the lower water heater thermostat control module. In some embodiments according to the invention, the switching generates a discontinuity in the circuit for the time needed to switch the power from the lower water heater thermostat control module to the upper water heater thermostat control module. The discontinuity can be associated with the electrical characteristic of the switching inside the water heater, which is sometimes referred to as a "break-before-make" state. In particular, the break-before-make state can be defined as the time interval from when the upper water heater thermostat control module switches away from the lower water heater thermostat control module until the time when contact to the upper heating element is established. In some embodiments according to the invention, the discontinuity may be realized as a drop in voltage across the load control device (e.g., the load control relay). In some embodiments according to the invention, the discontinuity may be realized as a drop in voltage across the load control device to about zero volts. In some embodiments according to the present invention, the demand management system may receive an indication of the switch as the indication of the low hot water reserve condition and may take action, such as removing the water heating unit from the load shedding event so that power is restored to the water heating unit and hot water subsequently provided to the user, even if the load shedding event continues for other water heating units that did not detect the low hot water reserve condition.

Still further, in some embodiments, the discontinuity associated with the switch can be based on measurements and information supplied by manufacturers of commonly used water heater thermostats. For example, in some embodiments, the time interval of the switch from the lower water heater thermostat control module to the upper heating element can be about 20 milliseconds. During the 20-millisecond time interval no power can pass through the water heater's electric circuit (i.e., the circuit is open). This momentary open circuit state of the water heater electric circuit can be detected using a high impedance line voltage detection circuit (voltmeter) measuring the voltage signal across the contacts in the load control device. In some embodiments according to the invention, the voltage signal is measured from the input to the output of the load control device. A processor circuit can monitor the voltage signal level detection circuit for the discontinuity of about 20 millisecond and provide a control signal that can be used to terminate load control of the water heater and allow that water heater to run to replenish the used hot water.

It will be understood that the term "relay" as used herein can refer to any electrically controlled switch that is configured to selectively couple an input to an output(s) responsive to a control signal or condition. Examples of a relay can include an electromechanical-based device, a mechanically-based device, or a semiconductor-based device. Other device types can also be included in the term "relay."

FIG. 1 is a block diagram that illustrates a power demand management system 100 including a load shed system 105 administered by an electrical utility to a plurality of locations 115A-B each including respective water heating units 120A-B that operate in a load shed mode to couple/decouple a leg of power to/from the respective water heating unit 120A-B responsive to detecting an indication of a low hot water reserve condition in some embodiments according to the invention. As shown in FIG. 1, the electrical utility can control the demand for power distributes via a network 110 that couples the load shed system 105 to the respective water heating units 120 at each of the locations 115. It will be understood that although the system 100 illustrates two water heating units 120, additional water heating units 120 may also be managed by the load shed system 105 in some embodiments according to the invention.

According to FIG. 1, the power can be coupled/decoupled to/from the water heating units 120 at each of the locations 115 individually. In other words, the load shed system 105 can selectively couple power to/from any of the water heating units 120. Accordingly, in embodiments according to the invention, the load shed system 105 can operate to adjust the power demands placed on the electric utility by the water heating units 120 responsive to detecting a low hot water reserve condition as described herein.

Figure 2:
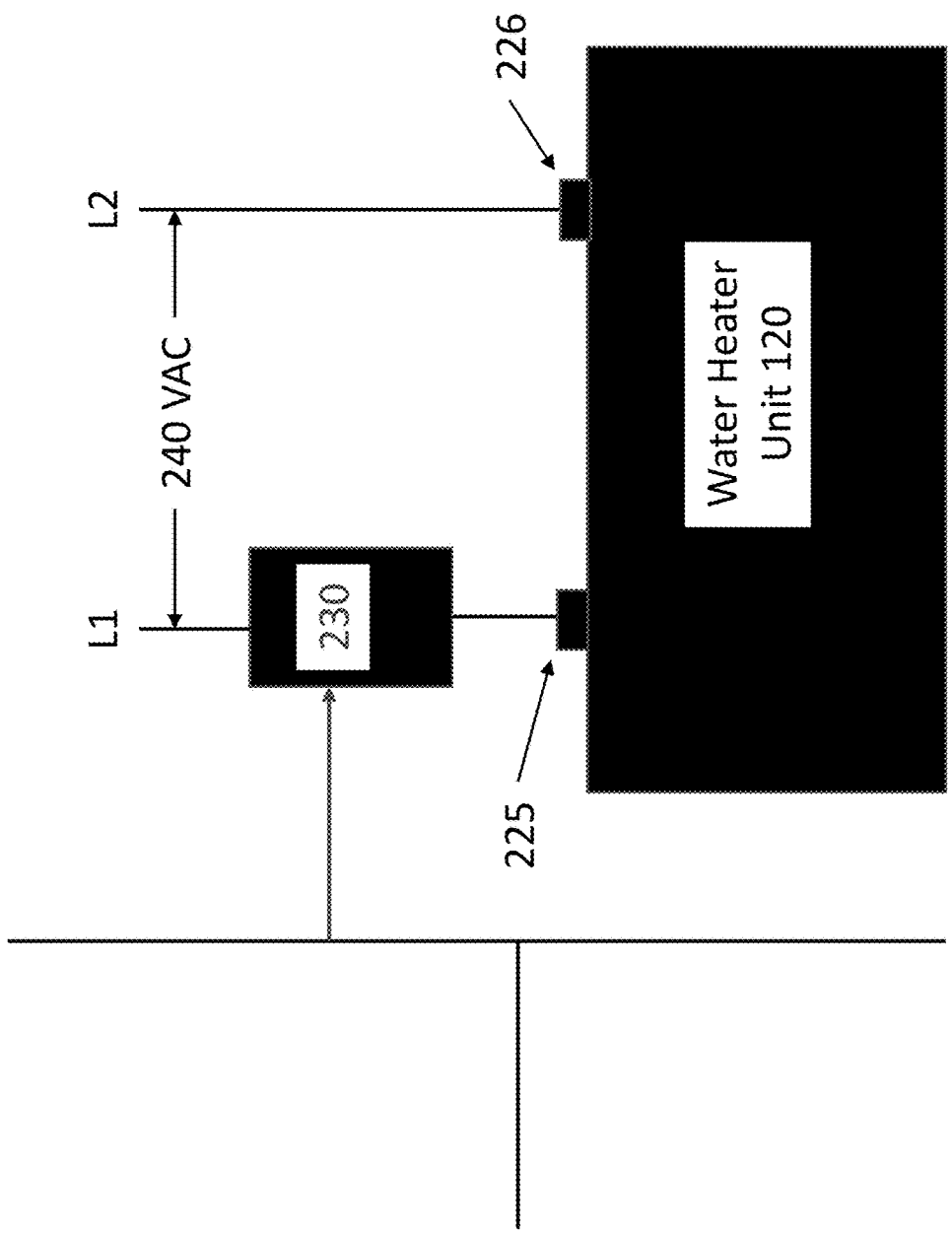
FIG. 2 is a block diagram of a water heating unit at a location having leg L1 of power coupled/decoupled to/from the water heating unit via a circuit configured to detect the indication of the low hot water reserve condition when operating in a load shed mode in some embodiments according to the invention.

FIG. 2 is a block diagram of a water heating unit 120 at a location 115 having leg L1 of power coupled/decoupled to/from the water heating unit via a circuit 230 configured to detect an indication of the low hot water reserve condition when operating in a load shed mode in some embodiments according to the invention. According to FIG. 2, power can be provided to the water heating unit 120 over legs L1 and L2 that are coupled to respective inputs 225 and 226 of the water heating unit 120. The inputs 225 and 226 are connected to the upper water heater thermostat control module as described herein. The legs L1 and L2 are configured to conduct 240 volts AC to the water heating unit 120 for heating of water stored in the tank under control of an upper water heater thermostat control module and a lower water heater thermostat control module in some environments according to the invention.

As further shown in FIG. 2, the load shed signal is provided to a circuit 230 that is configured to couple/decoupling the first leg of power L1 to/from the water heating unit 120 responsive to the load shed signal provided by the load shed system 105 over the network 110. In normal operation (i.e., the load shed signal is inactive), the circuit 230 connects L1 to the input 225 so that the water heating unit 120 can heat water. When the load shed signal is active, however, the circuit 230 can decouple the L1 power from the input 225 so that the water heating unit 120 does not receive the power needed to heat water. Accordingly, when the load shed signal is active the water heating unit 120 is operating in a load shedding event (sometimes referred to as in a load shed mode of operation) and does not return to heating water until the load shed mode is inactive.

It will be understood that while the water heating unit 120 operates in the load shed mode, hot water may still be drawn from the tank by the user. When, however, enough hot water is drawn from the tank, the low hot water reserve condition can be detected by monitoring a voltage signal outside the water heating unit 120. As the hot water in the tank is depleted, the temperature in the tank is reduced until the upper water heater thermostat control module again calls for heat, which is detected by the circuit 230 as the low hot water reserve condition. In response, the circuit 230 can override the load shed mode, whereupon L1 can be re-coupled to the upper water heater thermostat control module via the input 225 which enables the upper heating element to heat water in the upper portion of the water heating unit 120 in some embodiments according to the invention.

Figure 3:
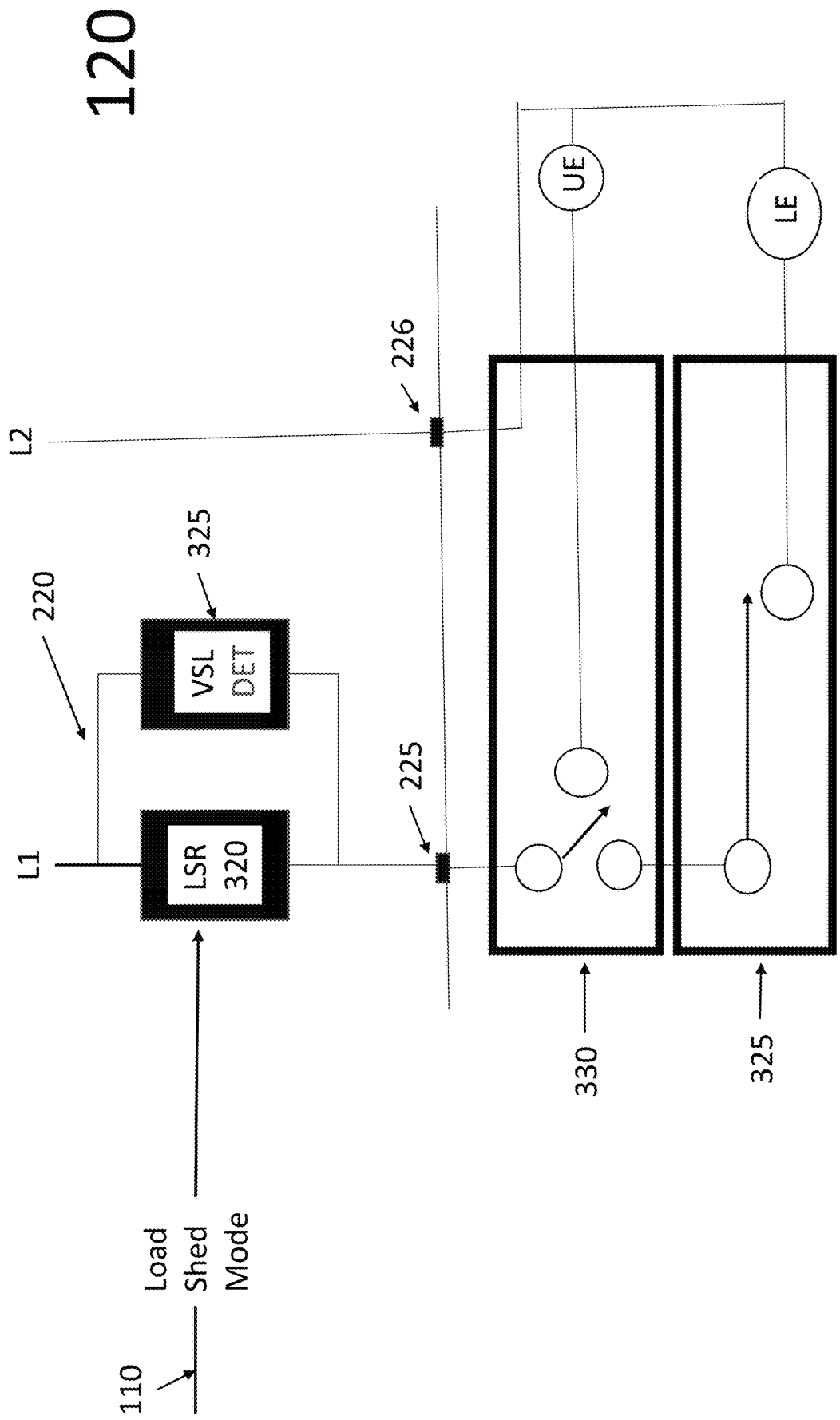
FIG. 3 is a schematic illustration of the circuit of FIG. 2 that includes a voltage signal level (VSL) detection circuit coupled across the input and output of a load shed relay that is configured to couple/decouple the leg L1 to/from the water heating unit responsive to the voltage signal level detection circuit detecting a discontinuity in a voltage signal across the input and output of the load shed relay as the indication of the low hot water reserve condition in some embodiments according to the invention.

FIG. 3 is a schematic illustration of a voltage signal level (VSL) detection circuit 325 coupled across the input and output of a load shed relay 320 that is configured to couple/decouple the leg L1 to/from the water heating unit 120 responsive to the voltage signal level detection circuit 325 detecting a discontinuity in a voltage signal across the input and output of the load shed relay 320 as the indication of the low hot water reserve condition in some embodiments according to the invention. According to FIG. 3, the water heating unit 120 includes an upper water heater thermostat control module 330 that is coupled to in upper heating element 332 positioned in an upper portion of the tank of the water heating unit 120. The upper water heater thermostat control module 330 receives power from L1 and L2 via inputs 225 and 226.

As shown, both L1 and L2 are coupled to the upper water heater thermostat control module 330 which is in turn distributed to a lower water heater thermostat control module 335 and a lower heating element 337 positioned in a lower portion of the tank. In particular, L1 is coupled to an input of the upper water heater thermostat control module 330 whereas the L2 is conducted through the upper water heater thermostat control module 330 to one side of the upper heating element 332 and further is coupled to a terminal of the lower heating element 337.

The upper water heater thermostat control module 330 switches between terminals 1 and 2 wherein the first terminal is coupled to the upper heating element 332 such that when the switch is coupled to terminal 2 power may be applied across the upper heating element via L1 and L2.

In contrast, when the upper water heater thermostat control module 330 is switched to the terminal 2, the power is switch to the input of the lower water heater thermostat control module 335. In operation, the lower water heater thermostat control module 335 switches the received power to terminal 1 when the lower thermostat control module 335 calls for heating of the lower portion of the tank whereas when the lower water heater thermostat control module 335 detects that the temperature set-point for the lower portion of the tank has been reached the lower water heater thermostat control module 335 switches to open terminal 2.

As further shown in FIG. 3, the voltage signal level (VSL) detector circuit 325 is coupled across the load shed relay 320. When the load shed relay 320 is activated by the load shed mode the load shed relay 320 opens to disconnect L1 from the input 225. In operation, the voltage signal level detector circuit 325 monitors the voltage seen across the load shed relay 320 as shown.

As appreciated by the present inventors, the voltage across the load shed relay 320 can indicate the low hot water reserve condition when the water heating unit 120 is in the load shed mode. When the low hot water reserve condition is detected, the voltage signal level detector circuit 325 can reset the load shed relay 320 to recouple L1 to the water heater input 225 to end the load shed mode for the water heating unit 120. It will be understood, therefore, that the release from the load shed mode can be localized to the particular water heating units 120 that detect the low hot water reserve condition whereas other water heating units 120 included in the load shed event may remain so as long as no low hot water reserve condition is detected by the respective water heating unit 120. In still further embodiments according to the invention, the low hot water reserve condition can be forwarded to the load shed system 105 which may in turn transmit a signal to the load shed relay 320 to remove the water heating unit 120 from the load shed event.

Figure 4:
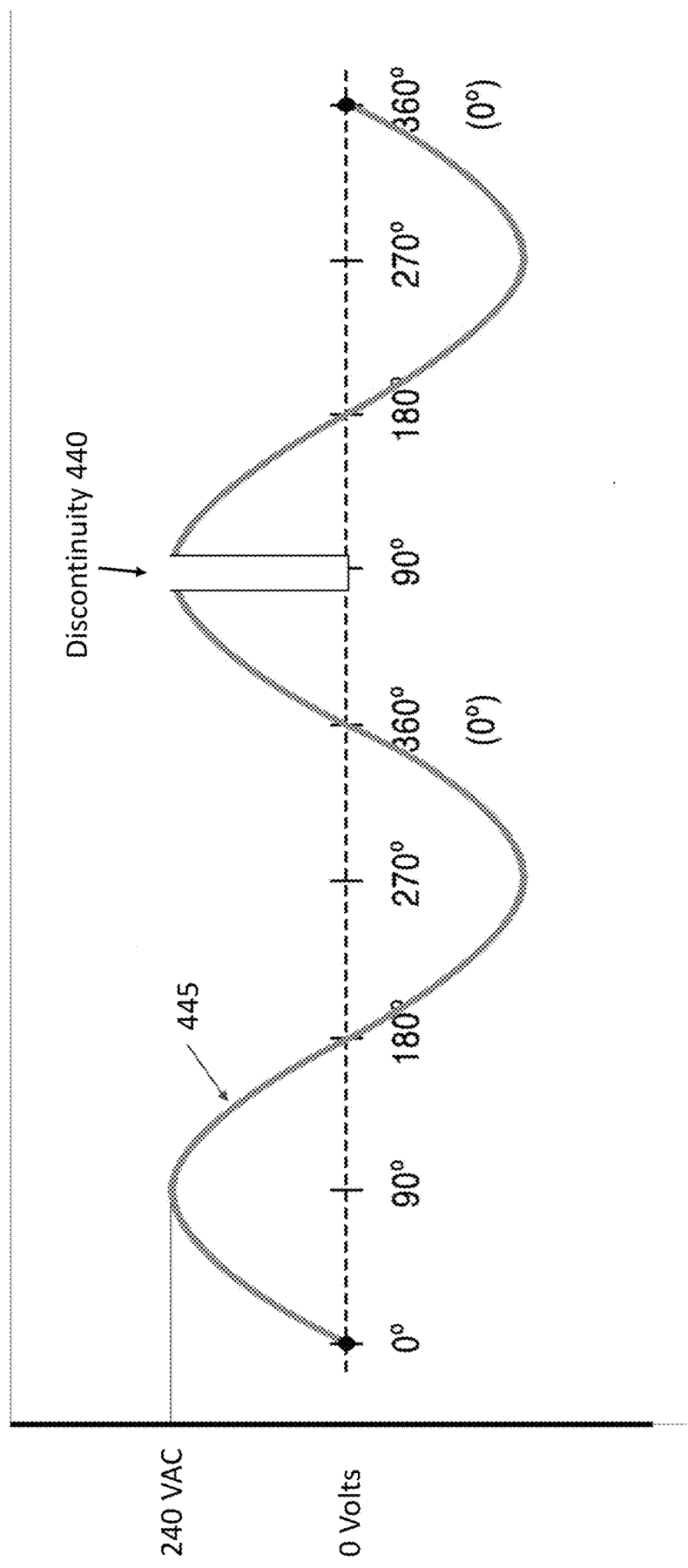
FIG. 4 is a graph of the voltage signal across the input and output of the load shed relay including the discontinuity as the indication of the low hot water reserve condition generated by a break-before-make state of the upper water heater thermostat control module when calling for heat in the load shed mode in the water heating unit in some embodiments according to the invention.

FIG. 4 is a graph of the voltage signal 445 across the input and output of the load shed relay applied to the voltage signal level detector circuit 325, including a discontinuity 440 generated by a break-before-make state of the upper water heater thermostat control module 320 when calling for heat in the load shed mode in the water heating unit 120 as the indication of the low hot water reserve condition in some embodiments according to the invention. According to FIG. 4, the voltage signal 445 is the voltage measured across L1 and L2 shown in FIG. 3. Still further, the voltage signal 445 has an amplitude of about 240 volts AC in order to power the water heating unit 120 to heat water. During operation in the load shed mode, the discontinuity 440 can be generated by the upper water heating thermostat control module 330 being in the break-before-make state wherein the pole 3 is in the process of switching from terminal 2 to terminal 1.

Figure 5:
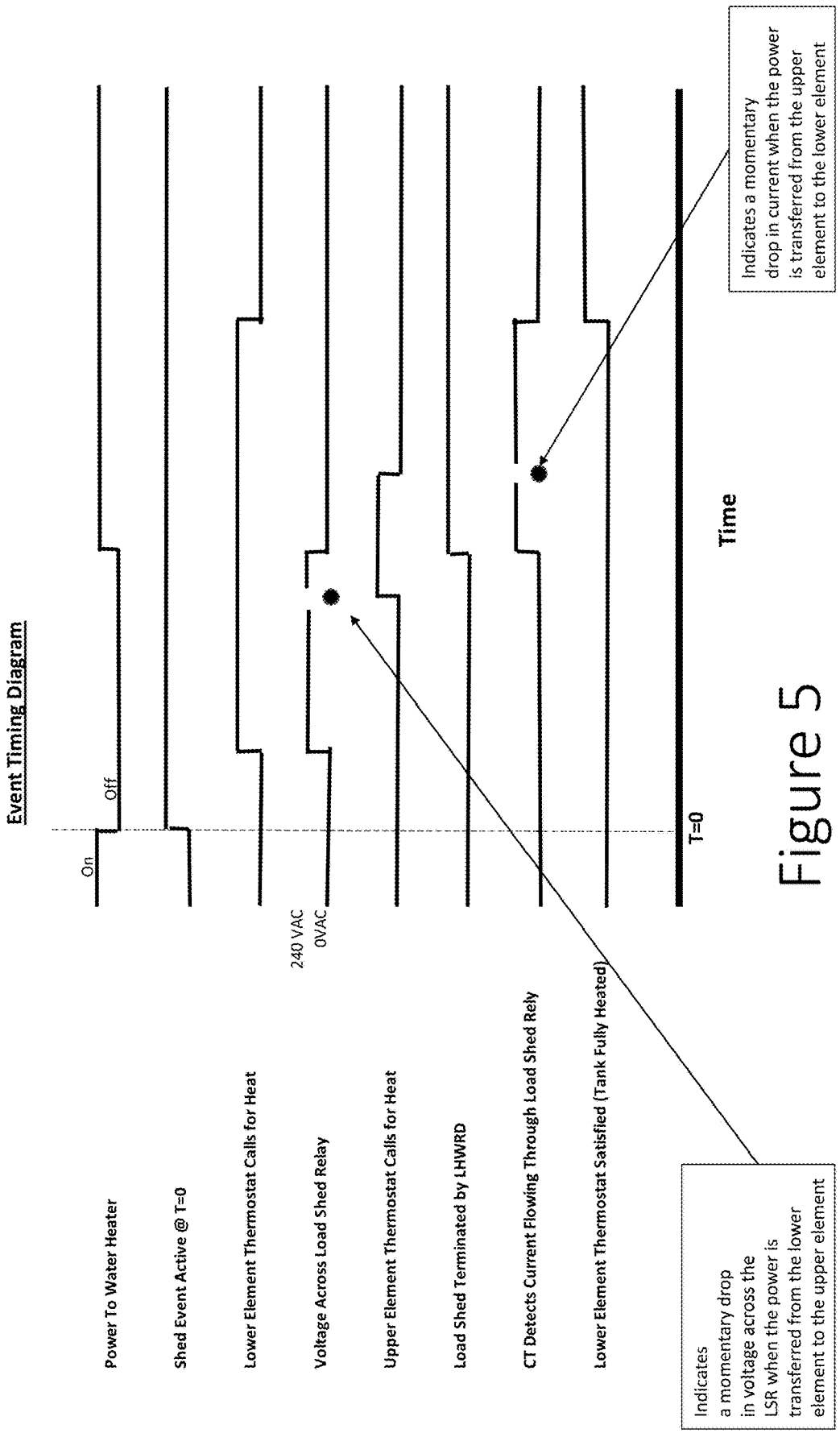
FIG. 5 is a timing diagram illustrating operations of the water heating unit and the voltage signal level detection circuit in the load shed mode responsive to detecting the discontinuity in the voltage signal across the input and output of the load shed relay as the indication of the low hot water reserve condition in some embodiments according to the invention.

FIG. 5 is a timing diagram illustrating operations of the water heating unit 120 and the voltage signal level detection circuit 325 in the load shed mode responsive to detecting the discontinuity 440 in the voltage signal 425 across the input and output of the load shed relay 320 as the indication of the low hot water reserve condition in some embodiments according to the invention. According to FIG. 5, operation of the water heating unit 320 is presumed to be initially in the fully satisfied state. Accordingly, when the load shed mode is activated as shown in FIG. 5 the upper and lower water heater thermostat control modules 330 and 335 are not calling for heat and has a full capacity of hot water in reserve.

As shown in FIG. 5, when the load shed mode is activated (shed active) the power to the water heater (power to WH) is deactivated such that L1 is decoupled from the input 235 by the load shed relay 320. Later enough hot water has been drawn from the water heating unit 120 so that the lower water heater thermostat control module 335 begins calling for heat (WH LE calling for heat). When the lower water heater thermostat control module 335 calls for heat, the voltage seen across the load shed relay 320 is at about 240 Volt AC measured by the voltage signal level detector circuit 325 (voltage across LSR).

As hot water is further drawn from the water heating unit under 20, the water heater upper water heater thermostat control module 330 begins calling for heat wherein the lower water heater thermostat control module 335 is removed from the circuit, which generates the discontinuity 440 in the voltage signal across the load shed relay 320. In some embodiments according to the invention the discontinuity 440 appears as a sudden and momentary reduction in the 240 Volt AC level present across the load shed relay 320 when the lower water heater thermostat control module 335 begins to call for heat heating. In some embodiments according to the invention, the sudden change in the voltage across the load shed relay 320 can be another value, such as zero or another voltage level between 0 and 240 volts AC. In some embodiments according to the invention, the discontinuity 440 in the voltage signal 445 is a deviation from sinusoidal nature of the 240 Volt AC power that is normally provided across L1 and L2.

Still further, the duration of the discontinuity 440 can be for a period T which ends when the switch to the upper water heater thermostat control module 330 is complete and thereby leaves the break-before-make state (whereupon the voltage across the load shed relay 320 returns to 240 volts AC). Still further, the discontinuity 440 detected by the voltage signal level detector circuit 325 can be used to end the load shed signal (end LS) which can be used to close the load shed relay 320 or alternatively, to transmit a signal to the load shed system 105, which in turn can control the state of the load shed relay 320 remotely. After the load shed mode ends and the water heating unit 120 is allowed to recover, the lower water heater thermostat control module may again start calling for heat, which can be detected by a current transformer that detects the change in current flowing in L1, which can be used to signal the load shed system 105 that the water heating unit is reheating. When the CT monitoring circuit detects a momentary drop in current the current monitoring circuit will make note that the water heater has switched from the upper heating element to the lower heating element. When the CT detects that the current has stopped for a certain period of time, one minute for example, the water heater is now fully charged and is again available for a load shed mode.

Figure 6:
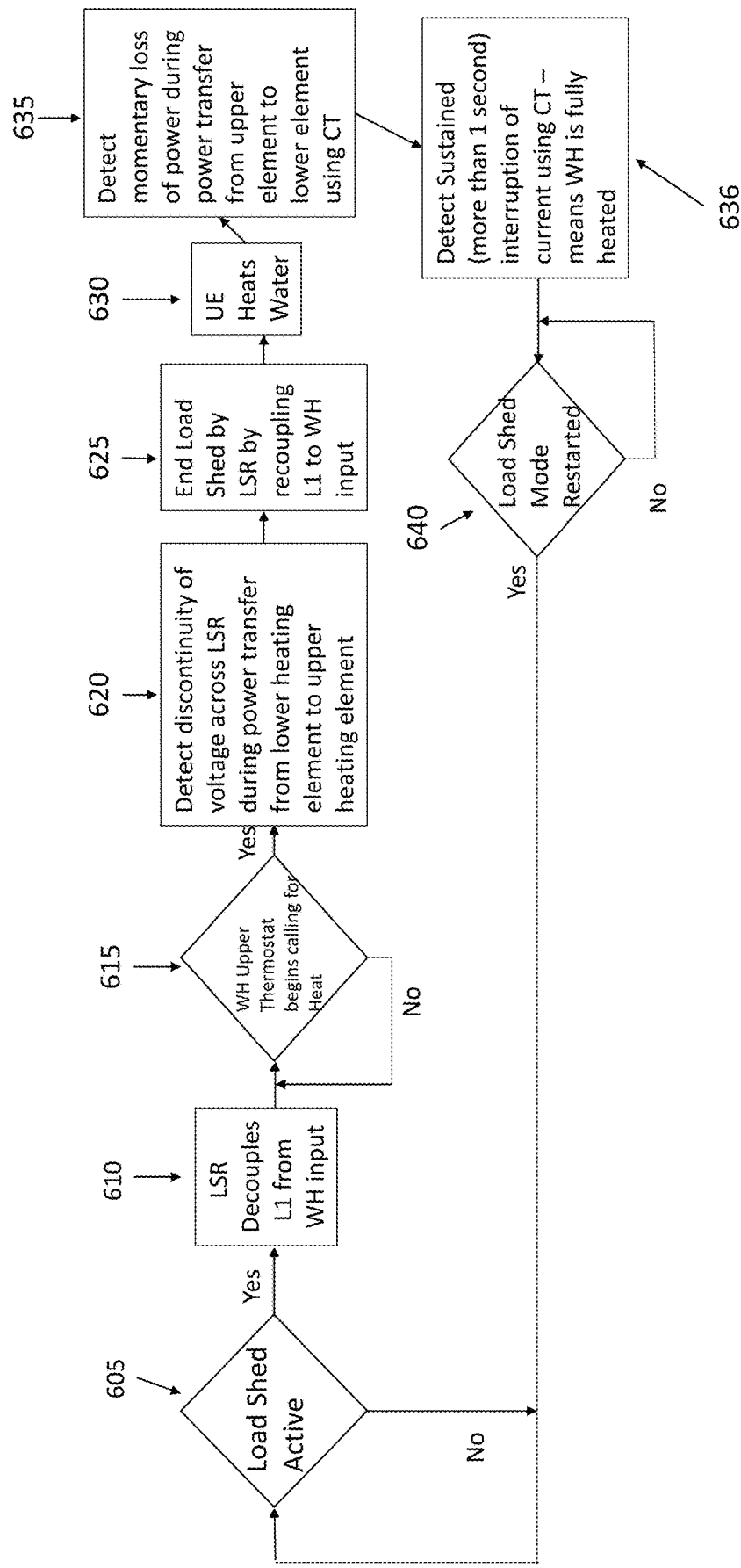
FIG. 6 is a flowchart illustrating operations of the water heating unit and the voltage signal level detection circuit in the load shed mode responsive to detecting the discontinuity in the voltage signal across the input and output of the load shed relay as the indication of the low hot water reserve condition in some embodiments according to the invention.

FIG. 6 is a flowchart illustrating operations of the water heating unit and the voltage signal level detection circuit 320 in the load shed mode responsive to detecting the discontinuity 440 in the voltage signal across the input and output of the load shed relay 320 as the indication of the low hot water reserve condition in some embodiments according to the invention. According to FIG. 6, operations begin when the load shed mode is activated (block 605). When the load shed mode is activated (block 605) the load shed relay 320 decouples L1 from the water heating unit input (block 610). When the upper water heater thermostat control module 330 then calls for heat (block 615) the voltage signal level detection circuit 325 is used to detect the discontinuity 440 in the voltage signal 440 across the load shed relay 320 which indicates the that the upper water heater thermostat control mode 330 is in the break-before-make state (block 620). When the discontinuity 440 is detected, the voltage signal level detection circuit 325 can end the load shed mode by closing the load shed relay 320 to recouple L1 to the water heating unit input (block 625). At this point, the water heating unit 120 is again provided with power whereupon the upper water heating thermostat control module 330 can implement heating (block 630). Later a current transformer CT may be used to indicate that either the lower or upper water heater thermostat control module 335 is calling for heat (block 635). In some embodiments, the indication can be provided by an interruption of the current for a time interval, such as more than 1 second, to show that the water heating unit is fully heated (block 636). When it is determined that the water heater is fully charged (no current flowing into the water heater) the load shed mode may again be allowed (block 640) whereupon the load shed mode enable signal can be transmitted to the load shed system 105 (block 645) and operations then continue at block 605.

Figure 7:
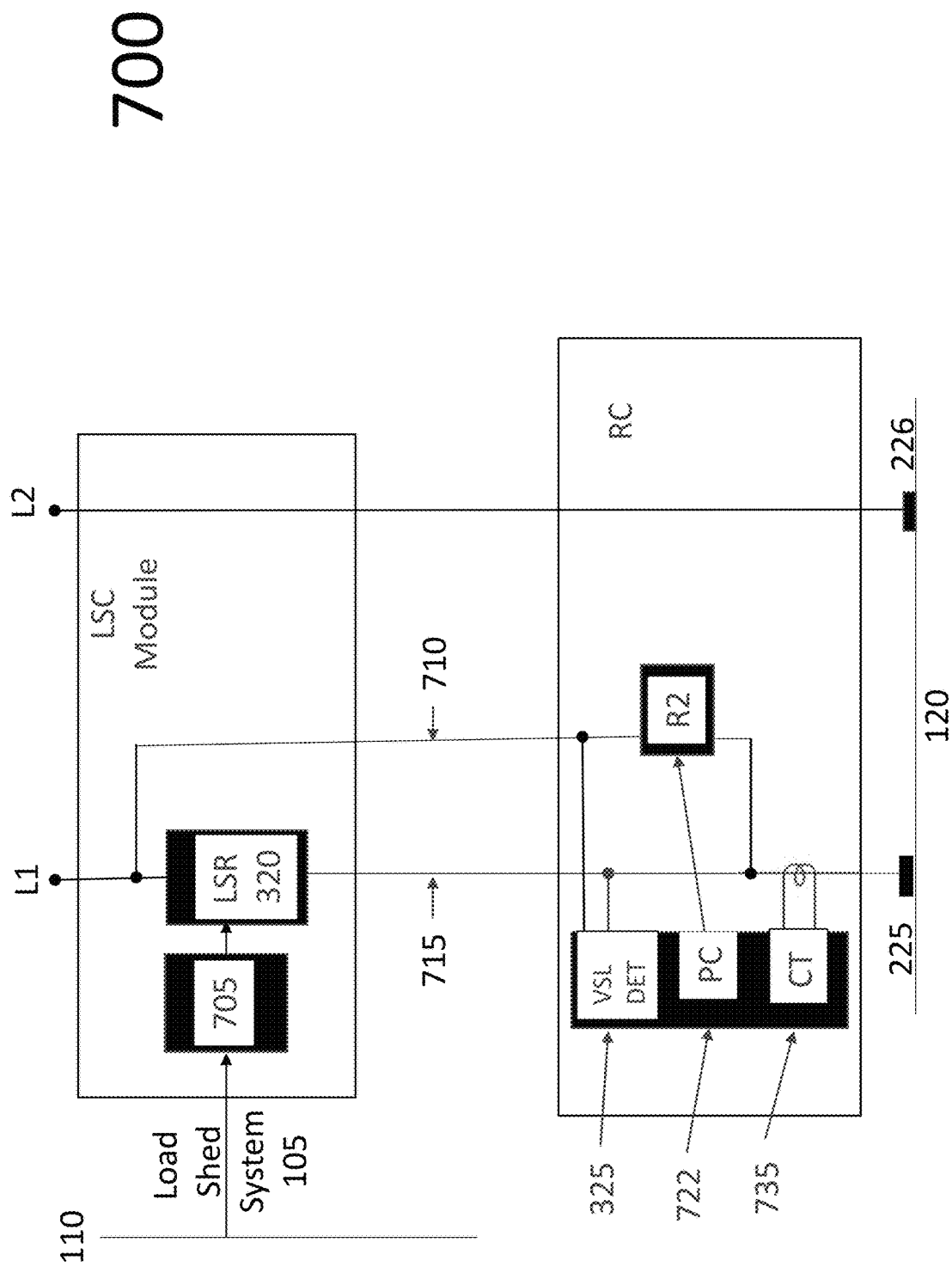
FIG. 7 is a schematic illustration of the circuit of FIG. 2 that includes a voltage signal level detection circuit and a current transformer circuit as a retrofit with an pre-existing control module configured to operate the water heating unit in the load shed mode in some embodiments according to the invention.

FIG. 7 is a schematic illustration of the circuit RC of FIG. 2 that includes a voltage signal level detection circuit 325 and a current transformer circuit 735 retrofitted with a pre-existing load shed control (LSC) module configured to operate the water heating unit 120 in the load shed mode in some embodiments according to the invention. According to FIG. 7, the pre-existing LSC module includes the load shed relay 320 which is used to de-couple the water heating unit 120 input 225 from L1 in the load shed mode. Leg L2 is also provided to the water heating unit 120 via the pre-existing LSC control module. In operation, the load shed system 105 can transmit the load shed signal to the pre-existing LSC module to activate/deactivate the load shed mode of operation for the water heating unit 120. The pre-existing LSC module also includes a processor circuit 705 which can be used to operate the load shed relay and provide other operations for use of the pre-existing LSC in some embodiments according to the invention.

As further shown in FIG. 7, the circuit RC includes the voltage signal level detection circuit 325 by monitoring of lines 710 and 715 which provide the ability to detect voltage across the load shed relay 320, to a processor circuit (PC) 722 that can detect the discontinuity 440 in the voltage signal 445 using analog to digital conversion circuits and software instructions in some embodiments. The circuit RC also includes a relay R2 that is coupled across the load shed relay 320 and operates under the control of the processor circuit 722 to provide a bypass so that L1 can be coupled to the water heating unit input 225 to override a load shed mode of operation. The current transformer 735 can be used to signal the processor circuit 722 when current begins to flow in L1, which can be used to indicate, for example, that the lower water heater thermostat control module is calling for heat, that the upper thermostat control module is calling for heat, and detect that a transition has occurred between the upper and lower water heater thermostat control modules in some embodiments.

Figure 8:
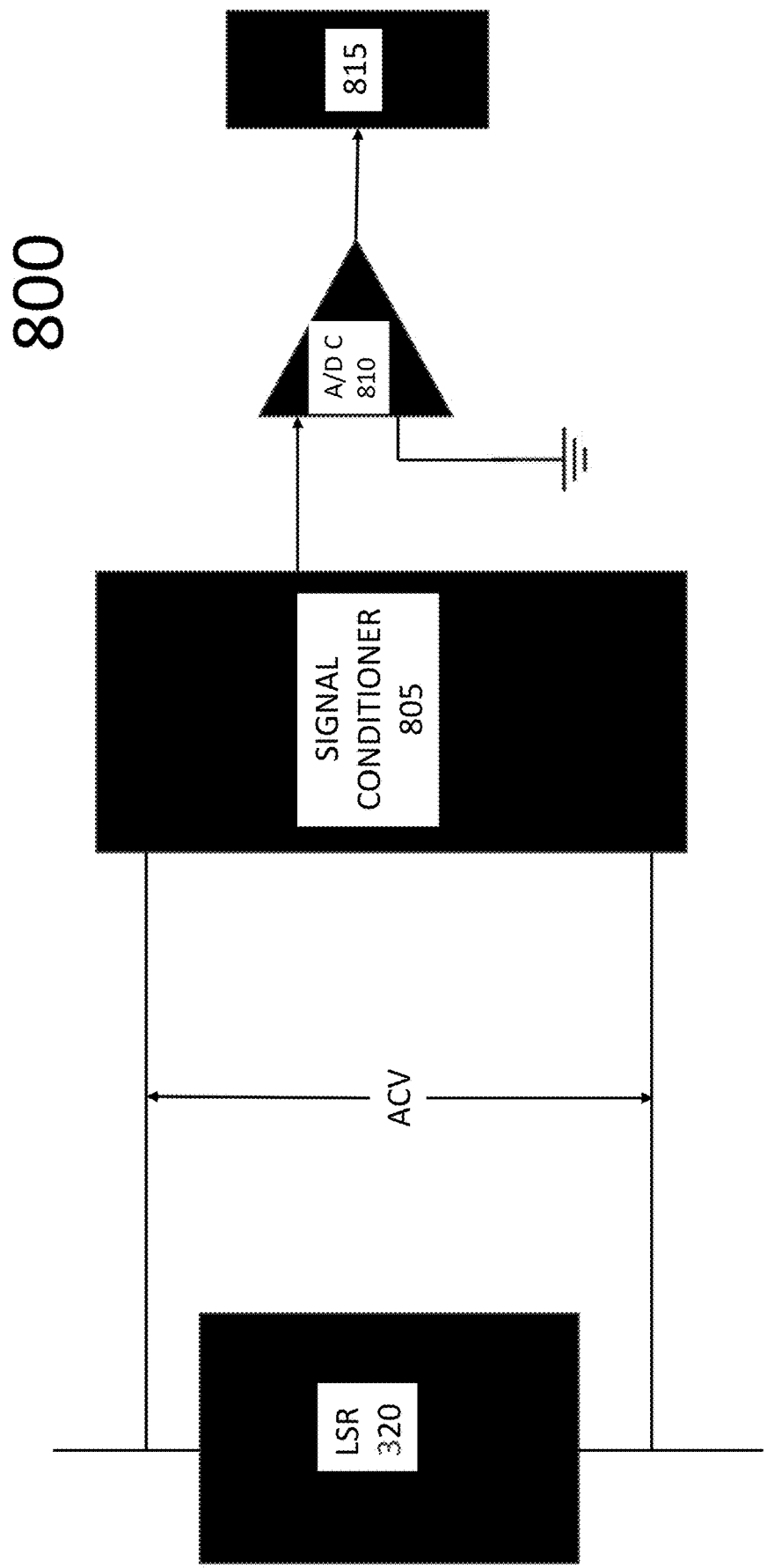
FIG. 8 is a schematic illustration of an analog-to-digital converter circuit included in the voltage signal level detection circuit configured to detect the discontinuity in the voltage signal across the input and output of the load shed relay as the indication of the low hot water reserve condition in some embodiments according to the invention.

FIG. 8 is a schematic illustration of an analog-to-digital converter circuit 800 included in the voltage signal level detection circuit 325 configured to detect the discontinuity 440 in the voltage signal 445 across the input and output of the load shed relay 320 as the indication of the low hot water reserve condition in some embodiments according to the invention. According to FIG. 8, a signaling conditioning circuit 805 is coupled across the load shed relay 320 to monitor the voltage signal and provide an output indicative of the voltage signal across the load shed relay 320 at the appropriate voltage level needed for an input signal to an analog to digital converter circuit 810. The analog to digital converter circuit 810 operates on the input from the signal conditioning circuit 805 to generate a digital value representative of the voltage signal across the load shed relay 320.

In operation, the digital signal provided by the analog to digital converter circuit 810 is provided to a processor circuit 815 that monitors the digital value of the voltage signal across the load shed relay 320 at an appropriate sampling rate so as to detect the discontinuity 440 in the voltage signal 445 having the approximate duration T that indicates the low hot water reserve condition as described herein in some embodiments.

Figure 9:
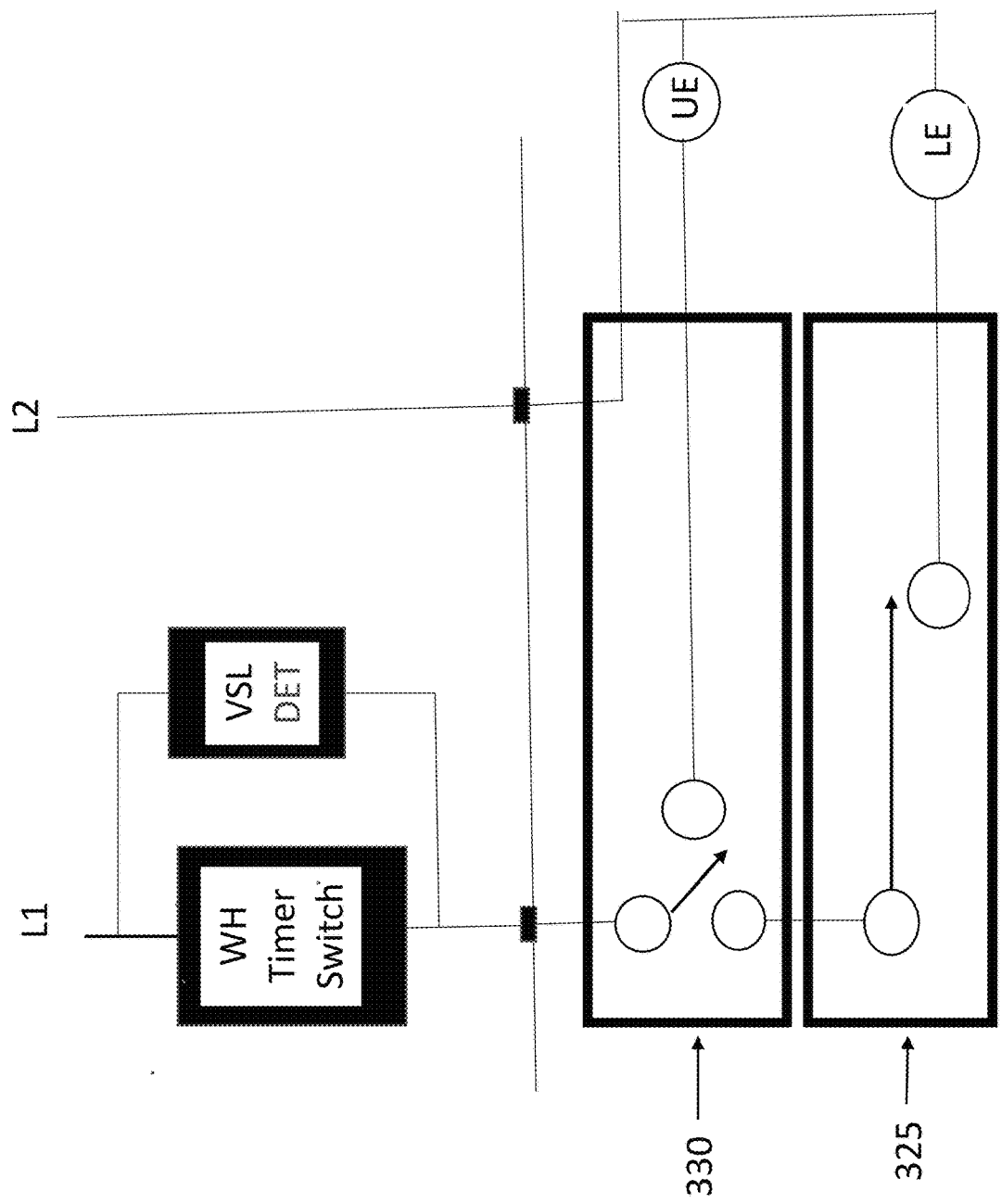
FIG. 9 is a schematic illustration of a circuit that includes a voltage signal level (VSL) detection circuit coupled across the input and output of a water heater timer switch that is configured to couple/decouple the leg L1 to/from the water heating unit responsive to timer circuit that can be bypassed responsive to the voltage signal level detection circuit detecting a discontinuity in a voltage signal across the input and output of the water heater timer switch as the indication of the low hot water reserve condition in some embodiments according to the invention.

FIG. 9 is a schematic illustration of a circuit that includes a voltage signal level (VSL) detection circuit coupled across the input and output of a water heater timer switch that is configured to couple/decouple the leg L1 to/from the water heating unit responsive to the timer circuit. According to FIG. 9, the VSL is configured to detect the discontinuity in the voltage signal across the input and output of the water heater timer switch as the indication of the low hot water reserve condition. In response, if the low hot water reserve condition is detected the when the water heater timer switch is off, the VSL can send a signal to the water heater timer switch to switch on to thereby couple L1 to the water heating unit. In some embodiments according to the invention, the VSL can include a bypass circuit that bypasses the water heater timer switch if the switch is currently off.

Figure 10:
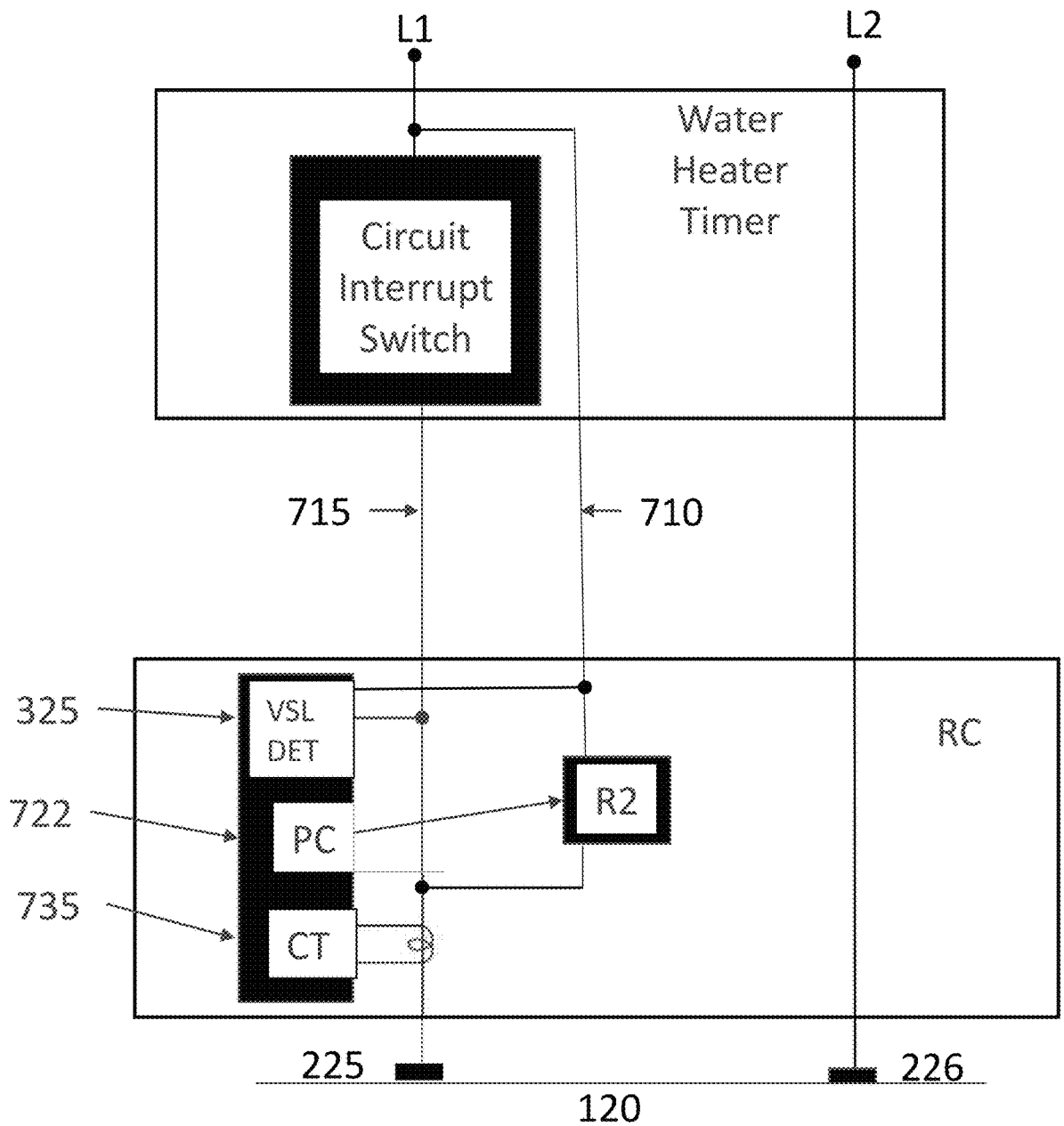
FIG. 10 is a schematic illustration of the voltage signal level detection circuit of FIG. 9 in more detail including a current transformer circuit in some embodiments according to the invention.

FIG. 10 is a schematic illustration of the voltage signal level detection circuit of FIG. 9 in more detail including a current transformer circuit in some embodiments according to the invention. According to FIG. 10, the VSL can include processor circuit that monitors the voltage across L1/L2 and can couple L1 to the water heating unit via a relay 720 when the low hot water reserve condition is detected if the water heater timer switch is off. As described herein, the current transformer CT can be configured to detect if the lower or upper water heater thermostat control module becomes active.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present. It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks. Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated (or physically separated) client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. An example of a client includes Internet Explorer® (Microsoft Corporation, Redmond, Wash.). Browsers typically provide a graphical user interface for retrieving and viewing web pages, web portals, applications, and other resources served by Web servers, A SOAP client can be used to request web services programmatically by a program in lieu of a web browser.

The applications provided by the service providers may execute on a server. The server can be a program that responds to the requests from the client. Some examples of servers are the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A method of operating a water heater in a load shed mode, the method comprising:
   detecting that an upper water heater thermostat control module in a water heater is calling for heat to be provided via an upper heating element of the water heater while the water heater is in a load shed mode of operation wherein a first leg of power to the water heater is decoupled from an input to the upper water heater thermostat control module; and
   responsive to the upper water heater thermostat control module calling for heat, transmitting a signal to end the load shed mode of operation at the water heater so that the first leg of power to the water heater is coupled to the input of the upper water heater thermostat control module so that the upper heating element of the water heater is enabled to heat water responsive to the upper water heater thermostat control module calling for heat.

2. The method of claim 1 wherein detecting that the upper water heater thermostat control module in the water heater is calling for heat to be provided via the upper heating element of the water heater comprises:
   detecting, while operating in the load shed mode of operation, when the upper water heater thermostat control module switches from a first state that couples an output of a load shed relay to a lower heating element in the water heater to a second state that couples the output of the load shed relay to the upper heating element.

3. The method of claim 2 wherein the load shed relay is configured to decouple a first leg of a pair of power conductors from an input of the upper water heater thermostat control module in the load shed mode of operation and couples the first leg to the input of the upper water heater thermostat control module outside the load shed mode of operation.

4. The method of claim 2 wherein detecting, while operating in the load shed mode of operation, when the upper water heater thermostat control module switches from the first state to the second state comprises:

detecting a discontinuity in a voltage signal measured from the output of the load shed relay to an input of the load shed relay in a load shed enabled configuration when the upper water heater thermostat control module switches from the first state to the second state.

5. The method of claim 4 wherein the voltage signal comprises an ac voltage signal.

6. The method of claim 5 wherein detecting the discontinuity in the voltage signal comprises detecting that the ac voltage signal is interrupted while the upper water heater thermostat control module is between the first state and the second state.

7. The method of claim 6 wherein when the upper water heater thermostat control module is between the first state and the second state comprises a break-before-make state of the upper water heater thermostat control module.

8. The method of claim 7 wherein the voltage signal is about 240 Volts ac in the first state and is about 240 Volts ac in the second state.

9. The method of claim 8 wherein the voltage signal is less than 240 Volts ac in the break-before-make state.

10. The method of claim 8 wherein the voltage signal is about 0 Volts in the break-before-make state.

11. The method of claim 4 wherein the discontinuity in the voltage signal is a time interval in a range between about 0.1 ms and about 20 ms.

12. The method of claim 1 further comprising:
after ending the load shed mode of operation, detecting that a lower water heater thermostat control module is calling for heat.

13. The method of claim 12 further comprising:
transmitting a signal, responsive to detecting that a lower thermostat control module is calling for heat, wherein the signal is configured to indicate that the water heater is available for a new load shed mode of operation.

14. The method of claim 12 wherein detecting that the lower water heater thermostat control module is calling for heat comprises detecting a change in a current carried by a first one of a pair of ac voltage conductors configured to provide power to the water heater responsive to when the lower water heater thermostat control module calls for the heat.

15. The method of claim 1 further comprising:
detecting that the upper water heater thermostat control module is calling for heat to be provided via a lower heating element of the water heater while the water heater is in the load shed mode of operation; and then
detecting that the upper water heater thermostat control module is calling for heat to be provided via the upper heating element.

16. A method of operating a water heater in a load shed mode, the method comprising:
decoupling at least one power conductor of a pair of conductors from an input terminal of an upper water heater thermostat control module, coupled to an upper heating element of a water heater, responsive to a load shed mode being activated; and
monitoring, using a voltage signal level detection circuit, a voltage signal measured across the input of a load shed relay and an output of the load shed relay coupled to an input of the upper water heater thermostat control module while the load shed mode is active to provide a monitored line voltage.

17. The method of claim 16 further comprising:
detecting a transition in a state of the upper water heater thermostat control module to switch power from a lower heating element of the water heater to the upper heating element of the water heater based on a change in the voltage signal measured across the input of the upper water heater thermostat control module while and an input to a load shed relay in the load shed mode; and
transmitting a signal requesting deactivation of the load shed mode for the water heater responsive to detecting the transition in the state of the upper water heater thermostat control module.

18. The method of claim 16 further comprising:
blocking subsequent activation of a subsequent load shed mode of the water heater upon detecting that the upper water heater thermostat control module has transferred the electric power from the lower water heater thermostat control module to the upper heating element of the water heater.

* * * * *